(12) United States Patent
Yeh

(10) Patent No.: US 10,394,529 B2
(45) Date of Patent: Aug. 27, 2019

(54) DEVELOPMENT PLATFORM OF MOBILE NATIVE APPLICATIONS

(71) Applicant: Chen-Chung Yeh, Taipei (TW)

(72) Inventor: Chen-Chung Yeh, Taipei (TW)

( * ) Notice: Subject to any disclaimer, the term of this patent is extended or adjusted under 35 U.S.C. 154(b) by 0 days.

(21) Appl. No.: 15/923,969

(22) Filed: Mar. 16, 2018

(65) Prior Publication Data

US 2018/0267782 A1 Sep. 20, 2018

(30) Foreign Application Priority Data

Mar. 17, 2017 (TW) .............................. 106108865 A

(51) Int. Cl.
*G06F 8/30* (2018.01)
*G06F 8/36* (2018.01)
*G06F 8/35* (2018.01)
*G06F 8/77* (2018.01)

(52) U.S. Cl.
CPC .................. *G06F 8/30* (2013.01); *G06F 8/35* (2013.01); *G06F 8/36* (2013.01); *G06F 8/77* (2013.01)

(58) Field of Classification Search
CPC ..... G06F 8/30; G06F 8/35; G06F 8/36; G06F 8/77
USPC .................................................. 717/106–109
See application file for complete search history.

(56) References Cited

U.S. PATENT DOCUMENTS

| 8,261,231 | B1* | 9/2012 | Hirsch | G06F 8/20 |
| | | | | 709/201 |
| 10,007,490 | B1* | 6/2018 | Duque de Souza | G06F 8/30 |
| 2008/0195997 | A1* | 8/2008 | Herberger | G06F 8/34 |
| | | | | 717/100 |
| 2012/0005255 | A1* | 1/2012 | Cherukuri | G06Q 10/10 |
| | | | | 709/203 |
| 2013/0247005 | A1* | 9/2013 | Hirsch | G06F 8/71 |
| | | | | 717/121 |
| 2013/0305218 | A1* | 11/2013 | Hirsch | G06F 8/30 |
| | | | | 717/106 |
| 2014/0019891 | A1* | 1/2014 | Borah | G06F 8/30 |
| | | | | 715/762 |
| 2014/0053126 | A1 | 2/2014 | Watson et al. | |
| 2014/0282398 | A1* | 9/2014 | Podolyak | G06F 8/71 |
| | | | | 717/121 |

(Continued)

FOREIGN PATENT DOCUMENTS

| CN | 101477462 A | 7/2009 |
| CN | 102375731 A | 3/2012 |

(Continued)

*Primary Examiner* — Qing Chen
(74) *Attorney, Agent, or Firm* — Muncy, Geissler, Olds & Lowe, P.C.

(57) ABSTRACT

The present disclosure relates to a cloud or a local development platform for a developer to develop mobile native applications without the need to write program code. The development platform supports the development of cross-platform (iOS and Android) and cross-industry mobile native applications, and provides various templates to help the developer quickly design the screen interactions and business process of mobile applications. For mobile native applications developed through the development platform, no publishing is needed when updating those mobile native applications. Whenever an update is made through the development platform, all the developed mobile native applications can be updated simultaneously.

25 Claims, 3 Drawing Sheets

(56) References Cited

U.S. PATENT DOCUMENTS

| | | |
|---|---|---|
| 2015/0100684 A1 | 4/2015 | Maes et al. |
| 2015/0186132 A1* | 7/2015 | Oliveri .................... G06F 8/34 717/120 |
| 2016/0034809 A1* | 2/2016 | Trenholm .......... H04L 41/5041 706/20 |
| 2016/0092179 A1* | 3/2016 | Straub .................... G06F 8/71 717/107 |

FOREIGN PATENT DOCUMENTS

| | | |
|---|---|---|
| CN | 104714830 A | 6/2015 |
| TW | 200602975 A | 1/2006 |
| TW | 201423550 A | 6/2014 |
| TW | 201500947 A | 1/2015 |

\* cited by examiner

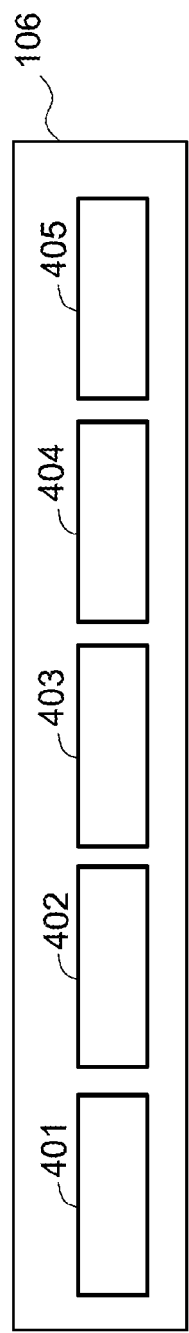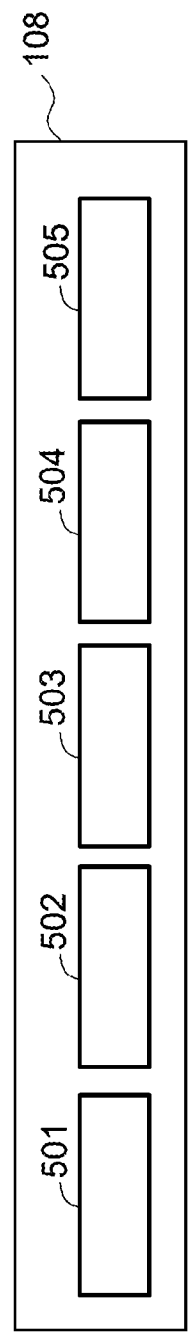
FIG. 4
FIG. 5

DEVELOPMENT PLATFORM OF MOBILE NATIVE APPLICATIONS

FIELD

The present disclosure relates generally to methods and systems for developing mobile native applications. More specifically, the present disclosure relates to methods and systems for a developer to develop mobile native applications without the need to write program code during development.

BACKGROUND

A development platform for mobile native applications can increase developers' efficiency of building and tuning the development environment. A developer can usually choose a development framework or version with development environment kits, and also monitor and control permissions for the developed application. In the development platform, a large number of function libraries are provided to increase the efficiency of application development.

A development platform for mobile native applications usually includes rapid environment building tools and a developer-friendly interface and provides a variety of program libraries. Environment building tools can help developers save time on building an environment; a developer-friendly interface can reduce the technical barriers developers may encounter in developing a mobile native application; and the variety of program libraries enable developers to accelerate the development of a mobile native application.

Before using a development platform for mobile native applications to develop a mobile native application, developers must receive a certain level of training on computer programming. For example, developers must have a certain degree of knowledge about the infrastructure of the mobile native applications they wish to develop and developers also need to write program code in the development process. However, the use of such a development platform for mobile native applications will create a higher technical barrier for developers.

SUMMARY

One aspect of the present disclosure relates to a mobile native application development method. The method provides a development platform with a mobile native application template library comprising template components. The developer can efficiently design a mobile native application through the development platform without the need to write any program code.

Another aspect of the present disclosure relates to a non-transitory computer-readable storage medium used to store instructions for performing a method for developing a mobile native application. The method for developing a mobile native application provides the development platform of the mobile native application templates, wherein the developer develops a mobile native application through the development platform without the need to write program code.

Another aspect of the present disclosure relates to a system for developing a mobile native application, the system comprising a non-transitory computer-readable storage medium storing instructions for performing a method for developing the mobile native application, and one or more processors configured to perform the instructions stored on the non-transitory computer-readable storage medium.

BRIEF DESCRIPTION OF THE DRAWINGS

FIG. 4 is a schematic diagram of the structure of configuration logics.

FIG. 5 is a schematic diagram of the structure of a mobile native component transform engine.

DETAILED DESCRIPTION

Figure 1:
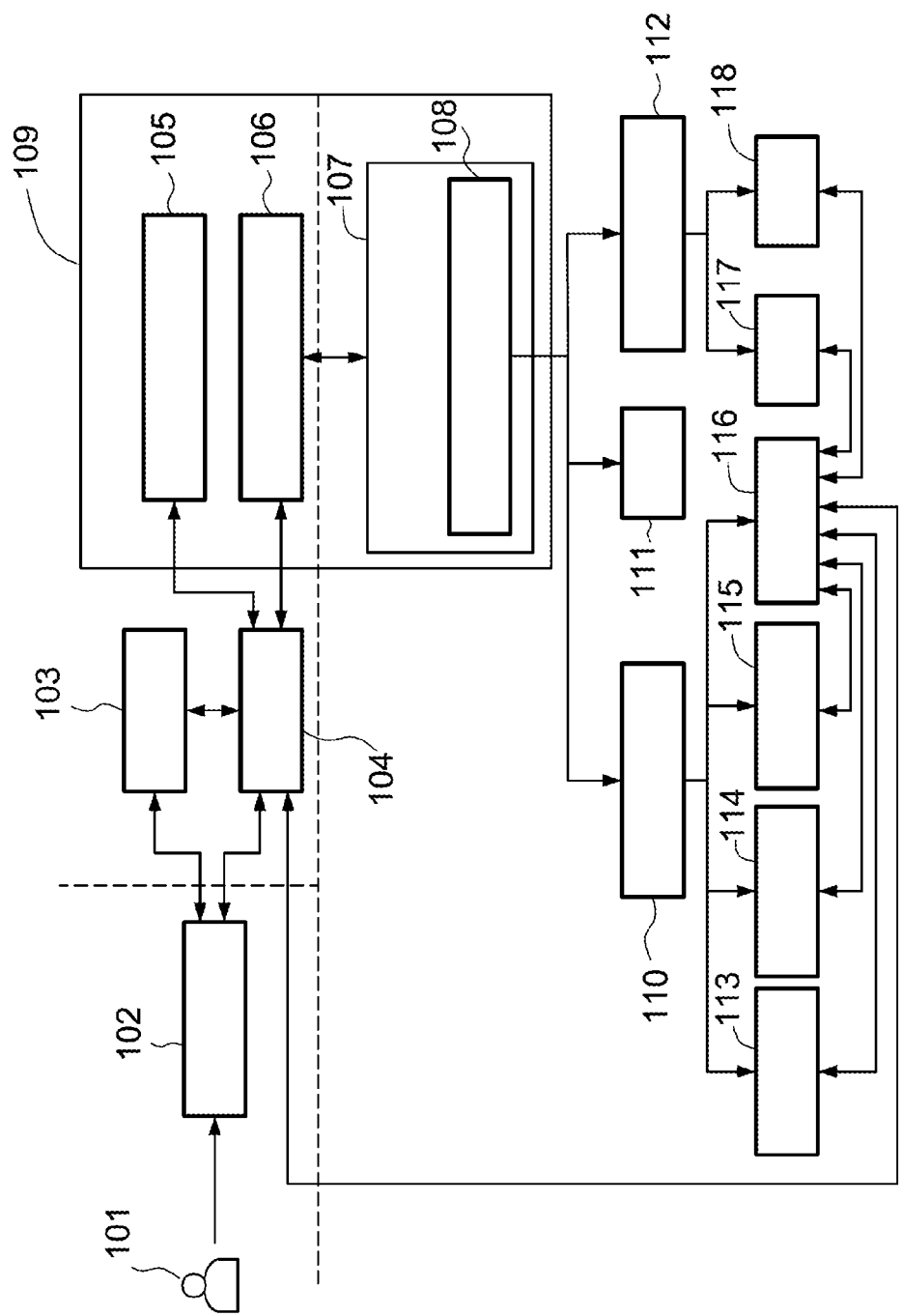
FIG. 1 is a schematic diagram of a mobile native application development method and system in accordance with one embodiment of the present disclosure.

FIG. 1 is a schematic diagram of a mobile native application development method and system in accordance with one embodiment of the present disclosure. As shown in FIG. 1, the upper left area surrounded by dashed lines is the developer end; the upper right area surrounded by dashed lines is the server end and the lower area surrounded by dashed lines is the mobile device end. A developer 101 can use a template component 103 to quickly design a mobile native application 107 and plan business flows through a developer development interface 102, and can instantly develop a latest version of the mobile native application 107 without the need to write program code. Additionally, the developer 101 can connect to a server 104 through the developer interface 102. The server 104 interacts with the template component 103 and controls mobile application variables 105 and a mobile configuration logic 106. The mobile configuration logic 106 can act with the mobile native component transform engine 108 of the mobile native application 107. A development platform 109 including the mobile native application variables 105, the mobile configuration logic 106, the mobile native application 107 and the mobile native component transform engine 108 can be constructed as easy to be understood, flexible and reusable integrated development platform. The developer 101 only needs to define the mobile application variables 105 for development, instantly update the latest version of the mobile native application 107 on the basis of the mobile configuration logic 106, and present the latest version of the mobile native application 107 through the mobile native component transform engine 108.

The mobile native component transform engine 108 can define application pages 110, menus 111 and application settings 112. The application pages 110 can set up page information 113, perform data processing 114, page presentation 115 to be presented and comprise a controller 116. When two of the page information 113, data processing 114 and page presentation 115 need to interact with each other, interactions can be done through the controller 116. The application settings 112 can process messages 117 and settings 118. Similarly, interactions between messages 117 and settings 118 can be done through the controller 116. The controller 116 can send the mobile native application transform engine 108 set up by the developer 101 back to the server 104. After the mobile native application 107 is developed by the developer 101 through the development platform 109, it becomes a new mobile native application template.

The development platform 109 supports the development of cross-platform (iOS and Android) and cross-industry mobile native applications, and provides all kinds of mobile native application templates to help the developer 101 quickly design the screen interactions and business flows of the mobile native application 107. No publishing is needed when updating the mobile native applications 107 developed through the development platform. Whenever an update is made on the development platform 109, all the developed mobile native applications 107 can be updated synchronously.

The mobile native applications 107 developed by the development platform 109 have all the characteristics of mobile native applications, including best performance efficiency, compatibility with all kinds of sensor devices and offline operability (webpage programs usually cannot operate offline). The mobile native applications 107 are, on the whole, no different from generally developed mobile native applications and can be optimized. The optimization includes but is not limited to the following: (i) for screen configurations, only a one-time setting is required to present the screen of the same design ratio under different resolutions and sizes of monitors; (ii) for network data access, the mobile native application 107 will process with background multi-threads to obtain all the network data in the most efficient way without the need to make additional settings; (iii) for the interaction of the user interface (UI) of the mobile native application 107, the response time of the UI will be minimized and all the UI elements can instantly receive and respond to actions of the user of the mobile native application 107 without delay; and (iv) for memory management, the least memory is used to achieve the greatest application, and the memory blocks will be used repeatedly and prompt the system to recycle portions that do not need to be used so as not to cause any memory leak. Regarding the screen arrangement, only a one-time setting is required to present the screen of the same design ratio under different resolutions and sizes of monitors. For example, different from the traditional way of directly giving specific values, the developer 101 can set the size, position, and length and width of the application component in percentages; for example, the width displayed will be 50% of the width of the screen if the width is set to be 50%.

In one of the embodiments of the present disclosure, the development platform 109 for mobile native applications 107 uses cloud technology. The cloud technology allows computers and applications to be remotely operated and accessed through the Internet. Under the cloud technology, a virtual machine is executed in a large data center and replaces physical computers and servers. By collecting and sending the computation requests of many developers 101 into a single data center, the cloud technology can produce significant effects such as less power consumption, easier installation and maintenance, and more convenience for capacity and performance upgrades. The developer 101 performs development on a local desktop computer or server and can real-time deploy the latest version of the mobile native application 107 to the cloud without publishing it. In another embodiment of the present disclosure, the development platform 109 for the mobile native application 107 of the present disclosure can also be implemented on a local computer without using cloud technology.

In an embodiment of the present disclosure, the template component 103 has a mobile native application template library 203. The mobile native application template 204 in the mobile native application template library 203 can come from mobile native applications previously developed by developers 101 through the development platform 109. For example, when a developer 101 has developed a specific mobile native application, the development platform 109 will generate a new mobile native application template when a mobile native application is created by the development platform 109, and renew the mobile native application template library 203 with the new generated template. When the same or another developer develops a mobile native application whose type of industry, market size, functional and non-functional requirements are similar to those of the specific mobile native application, the development platform 109 can recommend a specific mobile native application template 204, which, according to association rules, matches the developer's requirements among the mobile native application template library 203 of the template component 103; this can increase the efficiency of mobile native application development.

Figure 2:
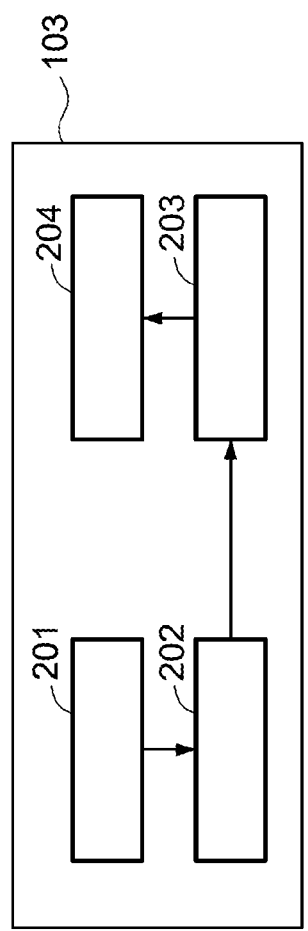
FIG. 2 is a schematic diagram of the structure of template components.

FIG. 2 is a schematic diagram of the structure of template component 103. As shown in FIG. 2, in one embodiment of the present disclosure, the development platform 109 collects a developer's business requirements which include type of industry and market size, functional and non-functional requirements for the mobile native application by the development platform 109 based on a dynamic programming algorithm 201, and finding out the most suitable mobile native application template 204 within a mobile native application template library 203 of the development platform 109 that meets requirements by the development platform 109 based on the association rules 202.

As shown in FIG. 2, a dynamic programming algorithm is similar to a divide- and conquer-algorithm. The central idea of a divide-and-conquer algorithm is to use a solution to a problem to depend on the sub-problems, and a divide-and-conquer algorithm is often used to determine the best solution to the problem. A divide-and-conquer algorithm usually works in a top-down manner and uses recursion. The difference between a dynamic programming algorithm and a divide-and-conquer algorithm is that a dynamic programming algorithm further uses a memorization mechanism, wherein the solutions to the sub-problems are recorded to prevent duplicate computation. Therefore, in the situation where the sub-problems overlap, using a dynamic programming algorithm can prevent duplicate computation and retain the advantages of recursion.

Association rules are common issues in data mining. Association rules are used to identify relationships between or among valuable data items from large amounts of data. The purpose of using association rules is to reduce potentially large disorganized data to a small amount of static data, which is easy to observe and understand. Association rules normally do not consider the order of items, but only consider the combinations of items.

Figure 3:
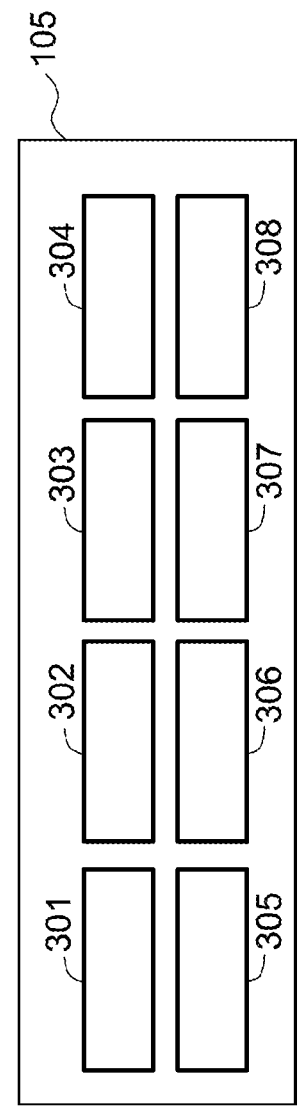
FIG. 3 is a schematic diagram of the structure of mobile native application variables.

FIG. 3 is a schematic diagram of the structure of the mobile native application variables 105 in FIG. 1. A set of the mobile native application variables 105 is a set of variables defined by a data storage format to develop the mobile native application 107. As shown in FIG. 3, in one embodiment of the present disclosure, the set of the mobile native application variables 105 include: page variables 301, menu variables 302, model variables 303, view variables 304, controller variables 305, flow variables 306, configuration variables 307 and locale & language variables 308.

The page variables 301 define basic settings of pages of the mobile native application 107 and mainly include: initial page action, show/hide menu and page order.

The menu variables 302 define settings of the main menu of the mobile native application 107 and mainly include:

width and height, menu templates, background colors and images, and menu items. The menu items define settings of each item in the main menu and mainly include: image and text, interactive style setting, event setting and menu item order.

The model variables 303 define methods for getting and processing data in the mobile native application 107 and mainly include: URLs and parameters for API, save data, handle before receive data, handle after receive data and handle exception.

The view variables 304 define all screen configurations in the mobile native application 107 and mainly include: native component type, position, width and height, attributes setting and interaction setting for native component.

The controller variables 305 and flow variables 306 define the logic designs of pages flow of the mobile native application 107 and mainly include: event trigger, action setting, action type and value definition, target action type and value, process control and exception handling.

The configuration variables 307 define the version, the server locations and other related settings and mainly include: server version control and data server locations for the mobile native application, which enables the developer to freely switch between services end servers.

The locale & language variables 308 define the language displayed in the mobile native application 107. After completing the settings, the mobile device obtains corresponding language text descriptions based on respective language settings.

FIG. 4 is a schematic diagram of the structure of mobile configuration 106. A logic set of the mobile configuration 106 is used to process parameters, logics and functions of the mobile native application 107 on the development platform 109. As shown in FIG. 4, in one embodiment of the present disclosure, the logic set of the mobile configuration 106 include: model logics 401, view logics 402, controller logics 403, configuration logics 404 and locale & language logics 405.

FIG. 5 is a schematic diagram of the structure of the mobile native component transform engine 108. The mobile native component transform engine 108 quickly and dynamically generate the mobile native application 107 by a configuration file generated from a logic set of mobile configuration with pure native program code. The mobile native component transform engine 108 is fast and flexible and provides the best user experience. As shown in FIG. 5, in one embodiment of the present disclosure, the mobile native component transform engine 108 includes: a model engine 501, a view engine 502, a controller engine 503, a configuration engine 504 and a locale & language engine 505. The configuration file can be generated from the logic set of mobile configuration according to the mobile native application variables filled by a developer for the mobile native component transform engine.

The model engine 501, which obtains data and implements methods required for obtaining data, is responsible for analyzing the data generated by the mobile configuration logics 106 to generate the native component dynamically of network resource access, database access, memory access and file access.

The view engine 502 implements methods required for producing screens, analyzes the data generated by the mobile configuration logics 106, and dynamically generates all native components for iOS and Android. Additionally, the view engine 502 comprises form templates to quickly generate a cross-industry mobile native form.

The controller engine 503 implements methods required for interaction, flow and business processes between the mobile native application 107 and a developer who is also an application user, analyzes the data generated by the mobile configuration logics 106, and dynamically generates all native controller components for iOS and Android, wherein the interaction mainly includes: click, long click, double click, multiple touch, drag, swipe and scroll. The page flow mainly includes: jump, push and pop. The controller engine 503 allows defining business process logics of each step and providing completed data transfer.

The configuration engine 504 defines global settings of the mobile native application 107, analyzes the data generated by the mobile configuration logic 106, and dynamically applies personal settings, which mainly includes: applying application themes, applying application main menu, and applying application updates and server settings.

The locale & language engine 505 defines language displays in the mobile native application 107 and analyzes the data generated by the mobile configuration logic 106 so that the displayed language can be switched on the mobile native application 107 by the language settings of the mobile device.

In one embodiment of the present disclosure, the development platform 109 provides a visual interface for the developer to perform the following steps: select a mobile native application template, design business processes and workflows, and design layouts of pages, thereby creating the whole mobile native application 107. Through the use of cloud technology, such an interface does not require the purchase, expansion or maintenance of hardware, or the installation of an operating system, a database server, or a platform server. The visual interface can support a debugging mode and thus provides the developer with a quick way to real-time check the logic errors in the mobile native application on the development platform 109, thereby allowing the developer 101 to efficiently and run a unit test directly on the mobile native application 107. After the mobile native application 107 is released, it is also possible to check the developer's usage statistics and instant bug reports through the development platform 109.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. There may be distinctions between the artistic renditions in the present disclosure and the actual apparatus. There may be other embodiments of the present disclosure which are not specifically illustrated. The specification and the drawings are to be regarded as illustrative rather than restrictive. Modifications may be made to adapt a particular situation or method to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. A method for developing a mobile native application, comprising:

providing a development platform with mobile native application templates,
wherein the development platform comprises:
   a first portion including mobile configuration logics;
   a second portion including mobile native application variables; and
   a third portion including a mobile native application, the mobile native application including a mobile native component transform engine; and
developing the mobile native application using the development platform,
wherein developing the mobile native application only requires defining the mobile native application variables, updating a latest version of the mobile native application based on the mobile configuration logics, and presenting the latest version of the mobile native application using the mobile native component transform engine, and
wherein developing the mobile native application using the development platform does not require writing any program code.

2. The method according to claim 1, further comprising:
collecting business requirements which include type of industry and market size, and functional/non-functional requirements for the mobile native application by the development platform based on a dynamic programming algorithm; and
finding out a most suitable mobile native application template which meets requirements by the development platform based on association rules.

3. The method according to claim 1, further comprising:
generating a new mobile native application template when a mobile native application is created by the development platform; and
renewing a mobile native application template library with the new generated mobile native application template.

4. The method according to claim 1, wherein a set of mobile configuration logics including model logics, view logics, controller logics, configuration logics, and locale & language logics is used to process parameters, logics, and functions of the mobile native application on the development platform.

5. The method according to claim 1, wherein a set of mobile native application variables including page variables, menu variables, model variables, view variables, controller variables, flow variables, configuration variables, and locale & language variables is defined by a data storage format.

6. The method according to claim 5, wherein the page variables define basic settings of mobile native application pages and include: initial page action, show/hide menu, and page order.

7. The method according to claim 5, wherein the menu variables define settings of a main menu of the mobile native application and include: width and height, a menu template, background colors and images, and a plurality of menu items.

8. The method according to claim 7, wherein the plurality of menu items defines settings of each item in the main menu of the mobile native application and includes: image and text, interactive style setting, event setting, and menu item order.

9. The method according to claim 5, wherein the model variables define methods for getting and processing data in the mobile native application and include: URL and parameters for API, save data, handle before receive data, handle after receive data, and handle exception.

10. The method according to claim 5, wherein the view variables define screen configurations in the mobile native application and include: native component type, position, width and height, attributes setting, and interaction setting for a native component.

11. The method according to claim 5, wherein the controller variables and flow variables define logic designs of page flows of the mobile native application and include: event trigger, action setting, action type and value definition, target action type and value, process control, and exception handling.

12. The method according to claim 5, wherein the configuration variables define versions, server locations, and other related settings and include: server version control and data server locations for the mobile native application.

13. The method according to claim 5, wherein the locale & language variables define a language displayed in the mobile native application, and wherein a mobile device obtains corresponding language text descriptions based on respective language settings after the respective language settings are completed.

14. The method according to claim 1, wherein a mobile native component transform engine including a model engine, a view engine, a controller engine, a configuration engine, and a locale & language engine generates the mobile native application by a configuration file generated from a set of mobile configuration logics.

15. The method according to claim 14, wherein the configuration file can be generated from the set of mobile configuration logics according to the mobile native application variables filled by a developer for the mobile native component transform engine.

16. The method according to claim 14, wherein the model engine obtains data and implements methods required for obtaining data, including analyzing data generated by the mobile configuration logics to generate native components dynamically of network resource access, database access, memory access, and file access.

17. The method according to claim 14, wherein the view engine implements methods required for producing screens and analyzing data generated by the mobile configuration logics, dynamically generates all native components of mobile native application platforms, and generates a form template of cross-industry form designs.

18. The method according to claim 14, wherein the controller engine implements methods required for interaction, flow, and business processes between the mobile native application and a developer who is also an application user, analyzes data generated by the mobile configuration logics, dynamically generates all native controller components of mobile native application platforms, and allows defining business process logics of each step and providing completed data transfer.

19. The method according to claim 14, wherein the configuration engine defines global settings of the mobile native application, analyzes data generated by the mobile configuration logics, and dynamically applies personal settings, which includes: applying mobile native application themes, applying mobile native application main menu, and applying mobile native application updates and server settings.

20. The method according to claim 14, wherein the locale & language engine defines a language displayed in the mobile native application and analyzes data generated by the mobile configuration logics so that the displayed language can be switched on the mobile native application by language settings of a mobile device.

21. The method according to claim 1, further comprising:
providing a visual interface without installing an operating system, a database server, or a platform server to create the mobile native application.

22. The method according to claim 21, wherein the visual interface further supports an error detection mode that enables logical errors real-time checking in the mobile native application on the development platform and runs a unit test directly on the mobile native application.

23. The method according to claim 1, further comprising:
real-time deploying by a latest version of the mobile native application without publishing.

24. A non-transitory computer-readable storage medium for storing instructions performing the method of claim 1.

25. A mobile native application development system, including:
the non-transitory computer-readable storage medium of claim 24; and
one or more processors configured to perform instructions stored on the non-transitory computer-readable storage medium.

* * * * *